United States Patent
Yu et al.

(10) Patent No.: US 10,567,211 B2
(45) Date of Patent: Feb. 18, 2020

(54) NONLINEARITY PRE-COMPENSATION OF HIGH ORDER MODULATION TRANSMISSIONS

(71) Applicant: ZTE Corporation, Shenzhen (CN)

(72) Inventors: Jianjun Yu, Basking Ridge, NJ (US); Hung-Chang Chien, Bridgewater, NJ (US)

(73) Assignee: ZTE Corporation, Shenzhen (CN)

( * ) Notice: Subject to any disclaimer, the term of this patent is extended or adjusted under 35 U.S.C. 154(b) by 79 days.

(21) Appl. No.: 15/814,347

(22) Filed: Nov. 15, 2017

(65) Prior Publication Data
US 2019/0149393 A1    May 16, 2019

(51) Int. Cl.
| H04L 27/36 | (2006.01) |
| H04B 10/61 | (2013.01) |
| H04B 10/079 | (2013.01) |
| H04B 10/524 | (2013.01) |
| H04L 5/00 | (2006.01) |

(52) U.S. Cl.
CPC ....... H04L 27/368 (2013.01); H04B 10/0799 (2013.01); H04B 10/524 (2013.01); H04B 10/612 (2013.01); H04B 10/6164 (2013.01); H04L 5/0048 (2013.01); H04B 10/6163 (2013.01)

(58) Field of Classification Search
CPC .................. H03F 1/3241; H03F 1/3247; H03F 2201/3233; H04B 10/6163; H04B 2001/0425; H04L 27/367; H04L 27/368
See application file for complete search history.

(56) References Cited

U.S. PATENT DOCUMENTS

| 2012/0321018 A1* | 12/2012 | Chen | H03F 1/3247 |
| | | | 375/296 |
| 2016/0065275 A1* | 3/2016 | Reuven | H04B 7/0413 |
| | | | 375/267 |
| 2019/0013866 A1* | 1/2019 | Irie | H04B 10/2543 |

OTHER PUBLICATIONS

Jia, Z., et al., "Experimental Demonstration of PDM-32QAM Single-Carrier 400G over 1200-km Transmission Enabled by Training-assisted Pre-equalization and Look-up Table," Optical Fiber Communication Conference, OSA Technical Digest (online) (Optical Society of America, 2016), Anaheim, California, USA, Paper Tu3A.4, pp. 1-3, Mar. 2016.

(Continued)

*Primary Examiner* — David S Huang
(74) *Attorney, Agent, or Firm* — Perkins Coie LLP

(57) ABSTRACT

An optical transmitter apparatus is disclosed. The apparatus includes a processor, a memory coupled to the processor, and one or more programs configured to be executed by the processor. The programs include instructions for nonlinearity estimation that characterizes nonlinearity in an optical communication and estimates an amount of symbol distortion caused by the nonlinearity, instructions for selecting and mapping symbols to provide, for the nonlinearity estimation, only symbols that meet predetermined nonlinearity criteria, and instructions for storing, in the memory, the amount of symbol distortion to be used for a nonlinearity pre-compensation.

20 Claims, 20 Drawing Sheets

(56) References Cited

OTHER PUBLICATIONS

Zhang, J., et al., "EML-based IM/DD 400G (4×112.5-Gbit/s) PAM-4 over 80 km SSMF Based on Linear Pre-Equalization and Nonlinear LUT Pre-Distortion for Inter-DCI Applications," Optical Fiber Communication Conference, OSA Technical Digest (online) (Optical Society of America, 2017), Los Angeles, California, USA, Paper W4I.A, pp. 1-3, Mar. 2017.

Zhang, J., et al., "Linear and Nonlinear Compensation for 8-QAM SC-400G Long-Haul Transmission Systems," Journal of Lightwave Technology, PP(99):1-6, Sep. 2017.

Zhu, Y., et al., "Spectrally-Efficient Single-Carrier 400G Transmission Enabled by Probabilistic Shaping," Optical Fiber Communication Conference, OSA Technical Digest (online) (Optical Society of America, 2017), Los Angeles, California, USA, Paper M3C.1, pp. 1-3, Mar. 2017.

\* cited by examiner

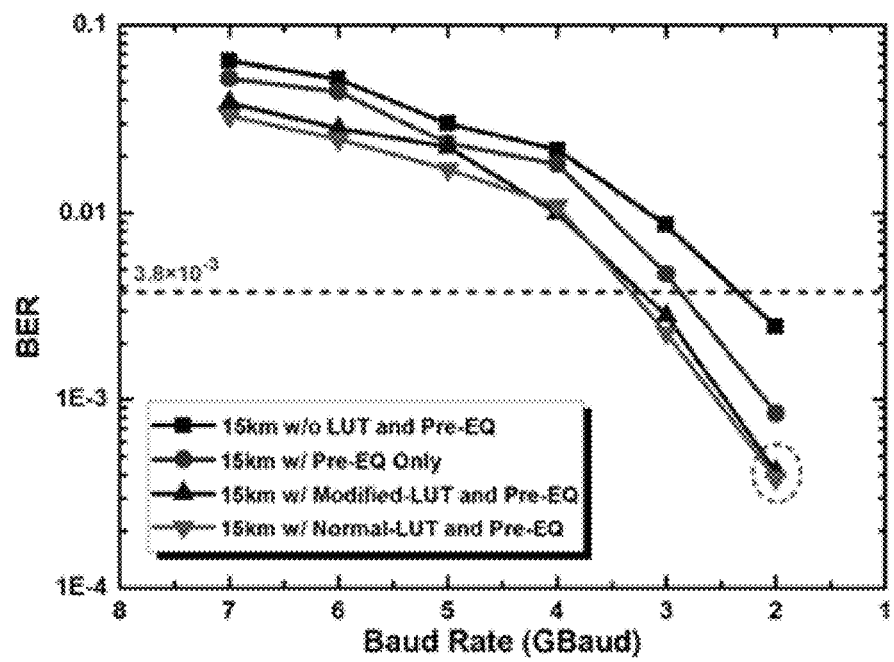
FIG. 16A
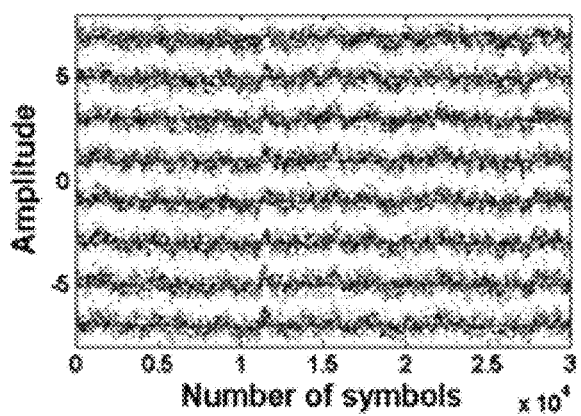
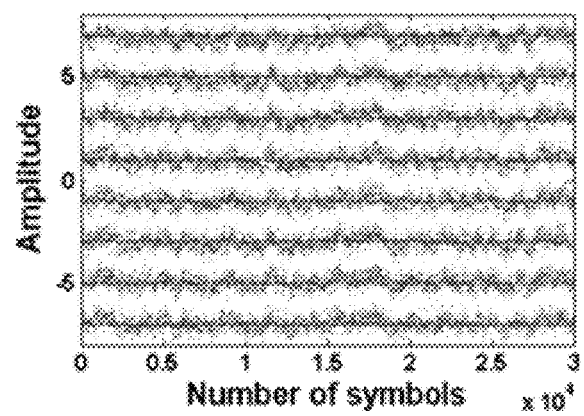
FIG. 16B
FIG. 16C

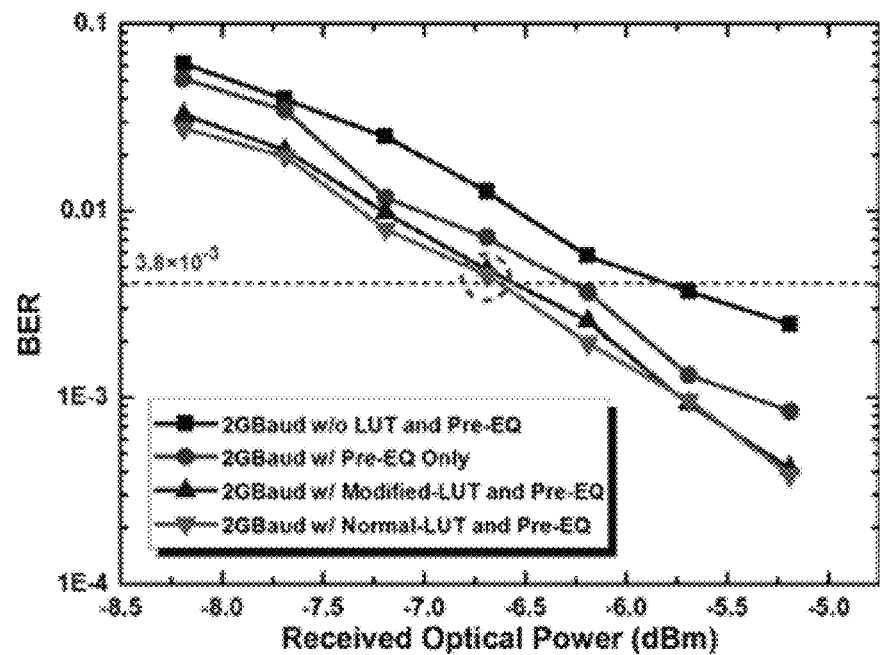
FIG. 17A
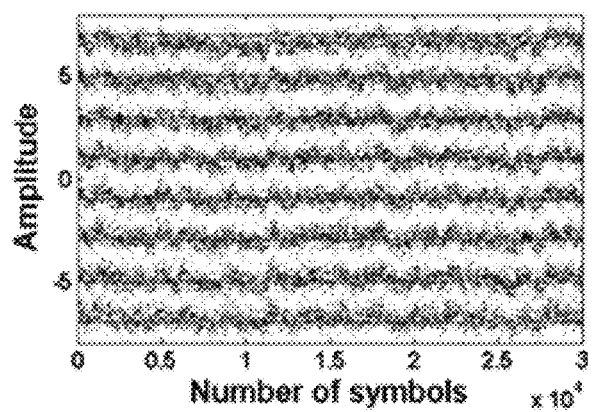 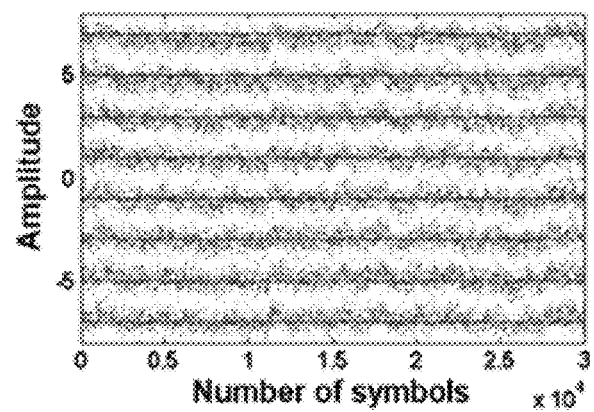
FIG. 17B              FIG. 17C

NONLINEARITY PRE-COMPENSATION OF HIGH ORDER MODULATION TRANSMISSIONS

TECHNICAL FIELD

This patent document relates to digital communication, and, in one aspect, non-linearity compensation techniques for higher order modulation.

BACKGROUND

With the increasing demand for high-rate, high bandwidth efficiency data communication systems, high order modulation techniques such as high order pulse amplitude modulation (PAM) and quadrature amplitude modulation (QAM) have gained attention in recent years. The advantage of higher order modulation is the possibility to transmit more bits per symbol. The data modulated by such higher order modulation techniques, however, becomes more susceptible to inter-symbol interference.

The inter-symbol interference is caused by nonlinear effects in both electrical and optical domains, such as drivers, amplifiers, modulators, and fibers. To avoid system degradation caused by the inter-symbol interference, equipment manufacturers and network operators are continually looking for ways of compensating for the nonlinear effects.

SUMMARY

The present document discloses look-up table generation techniques for pre-distortion and pre-equalization of signals to be transmitted, when the signal is transmitted using higher order PAM or QAM format.

In one example aspect, an optical transmitter apparatus is disclosed. The apparatus includes a processor, a memory coupled to the processor, and one or more programs configured to be executed by the processor. The programs include instructions for nonlinearity estimation that characterizes nonlinearity in an optical communication and estimates an amount of symbol distortion caused by the nonlinearity, instructions for selecting and mapping symbols to provide, for the nonlinearity estimation, only symbols that meet predetermined nonlinearity criteria, and instructions for storing, in the memory, the amount of symbol distortion to be used for a nonlinearity pre-compensation.

In another example aspect, an optical transmitter apparatus is disclosed. The apparatus includes a symbol mapper that receives data bits to be transmitted and generates multiple symbols containing the data bits therein by mapping the data bits into the symbols, and a pre-compensator that estimates an amount of symbol distortion caused by nonlinearity in an optical communication to perform a nonlinearity pre-compensation by using the amount of symbol distortion. The pre-compensator includes a symbol selector that selects certain symbols that meet predetermined nonlinearity criteria to be used in estimating the amount of symbol distortion, and a memory that stores the amount of symbol distortion.

In another example aspect, a method of calculating non-linearity in an optical communication include mapping a training sequence to a symbol pattern including multiple symbols, selecting symbols that meet predetermined non-linearity criteria, and estimating an amount of symbol distortion caused by the nonlinearity based only on the symbols that meet the predetermined nonlinearity criteria.

These, and other aspects, are disclosed in the present document.

BRIEF DESCRIPTION OF THE DRAWINGS

FIG. 16A shows graphs of BER versus baud rate in various situations

FIG. 16B shows PAM-8 symbol constellation obtained by look-up tables generated based only on high-level symbols.

FIG. 16C shows PAM-8 symbol constellation obtained by look-up tables generated based on all the symbols.

FIG. 17A shows graphs of BER versus received optical power in various situations.

FIG. 17B shows PAM-8 symbol constellation obtained by look-up tables generated based only on high-level symbols.

FIG. 17C shows PAM-8 symbol constellation obtained by look-up tables generated based on all the symbols.

DETAILED DESCRIPTION

A high-rate, high bandwidth data communication system can be realized by increasing the symbol rate. In addition, by increasing the number of states that carrier signals can take, the number of bits encoded in each symbol can increase. For example, in a PAM-8 format, three bits of data are transmitted in each symbol. The disadvantage of conveying many bits per symbol, however, is that the receiver has to distinguish many signal levels or symbols from each other. For high order PAM signals or QAM signals carried by optical, the nonlinearity impairments caused by modulators and/or fibers will further degrade system performance.

A nonlinear look-up table (LUT) pre-distortion and a linear adaptive time-domain pre-equalization can mitigate nonlinear impairments of the electro-optical components. The accuracy of channel response depends on symbol pattern, and thus larger look-up table distortion correction values can be obtained by using longer patterns. The computation complexity of the look-up table algorithm is determined by a number of look-up table symbols and a number of symbol states of the modulated signal. If the number of symbol states of look-up tables is M and the number of symbol states of the modulated signal is N, then the number of patterns would be $N^M$. For traditional PAM-8 look-up tables, if the number of look-up table symbols is three (3), then there are $8^3$ patterns, and if the number of look-up table symbols is five (5), then there are $8^5$ patterns. For traditional polarization multiplexing 64QAM look-up tables, there are $2 \times 8^3$ and $2 \times 8^5$ patterns when the number of look-up table symbols is 3 and 5, respectively. The longer patterns, however, will increase the computational complexity and make it impractical. Various implementations of this document, however, can minimize the computational complexity of the look-up table pre-distortion without deteriorating its ability to mitigate nonlinear impairments.

Figure 1:
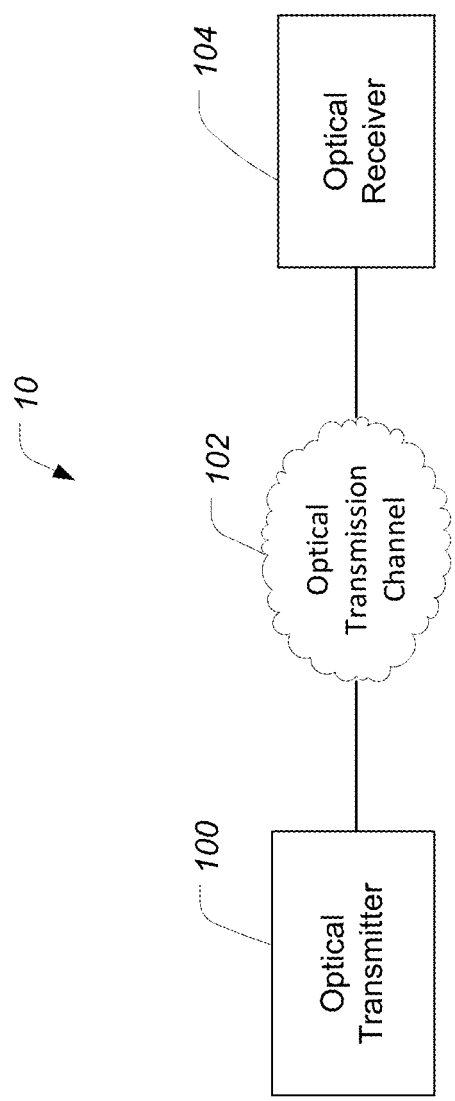
FIG. 1 shows an example optical communication system in which the presently disclosed technology can be implemented.

FIG. 1 illustrates an example optical communication system 10 in which the presently disclosed technology can be implemented. One or more optical transmitters 100 communicate with one or more optical receivers 104 via an optical transmission channel 102. Examples of the optical transmission channel 102 include optical fibers that extend in length from several hundred feet (e.g., last mile drop) to several thousands of kilometers (e.g., long haul networks). The transmitted optical signals may go through intermediate optical equipment such as amplifiers, repeaters, switch, etc., which are not shown in FIG. 1 for clarity. The optical transmitter 100 generates a look-up table to be used for a pre-distortion process based on a feedback from the optical receiver 104. In an implementation, the optical transmitter 100 may receive the feedback while being connected back to back to the optical receiver 104. In another implementation, the optical transmitter 100 may receive the feedback while being connected to the optical receiver 104 via the optical fibers discussed above.

In an implementation, the optical communication system 10 may include one or more processors (not illustrated) and one or more memories (not illustrated). The one or more memories may store processor-executable instructions and/or data during processor operation. The one or more processors may read instructions from the one or memories and implement a technique described in the present document. The one or more processors may perform various calculations to create look-up tables, and the one or more memories may store the look-up tables.

Figure 2:
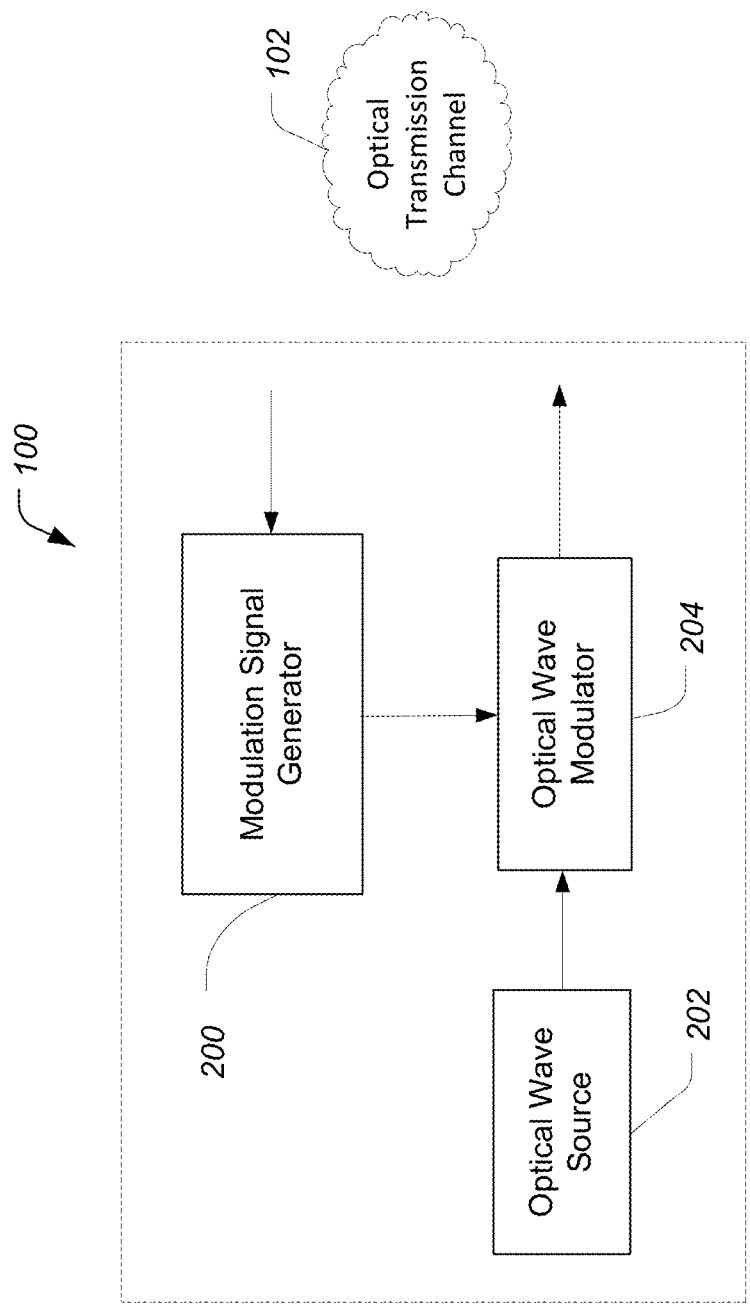
FIG. 2 shows an example implementation of an optical transmitter.

FIG. 2 illustrates an example optical transmitter 100. The optical transmitter 100 may include a modulation signal generator 200, an optical wave source 202, and an optical wave modulator 204. The optical wave source 202 generates an optical wave such as directly modulated lasers (DML). The modulation signal generator 200 may generate a high order modulation signal such as PAM-18 or 64QAM based on data bits to be transmitted via the optical transmission channel 102. The optical signal transmitter 100 uses the optical wave as a carrier wave by modulating it with electrical multi-level PAM or QAM signal generated based on the data bits.

Figure 3:
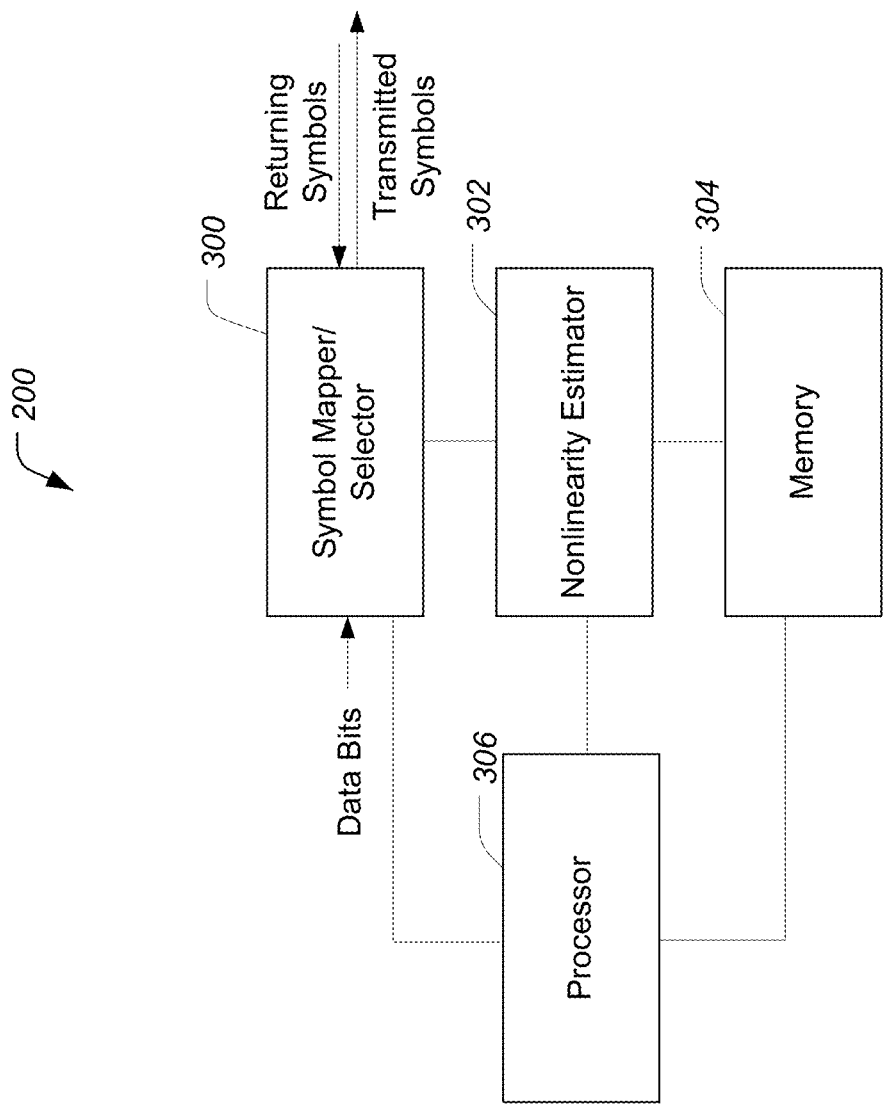
FIG. 3 shows an example implementation of a modulation signal generator.

FIG. 3 shows an example implementation of a modulation signal generator. In an implementation, a modulation signal generator in an optical transmitter apparatus may include a symbol mapper/selector 300, a nonlinearity estimator 302, a memory 304, and a processor 306. The processor 306 executes programs including instructions that are performed by the symbol mapper/selector 300 and the nonlinearity estimator 302. The symbol mapper/selector 300 transmits symbols to a receiver and receives symbols returning from the receiver. The nonlinearity estimator 302 characterizes nonlinearity in an optical communication and estimates an amount of symbol distortion caused by the nonlinearity. To estimate the amount of symbol distortion caused by the nonlinearity, the symbol mapper/selector 300 provides the nonlinearity estimator 302 with only symbols that meet predetermined nonlinearity criteria. The memory 304 stores the amount of symbol distortion to be used for a nonlinearity pre-compensation. In an implementation, the nonlinearity estimator may generate, based only on the symbols that meet the predetermined nonlinearity criteria, a look-up table by which the amount of distortion is represented.

Figure 4A:
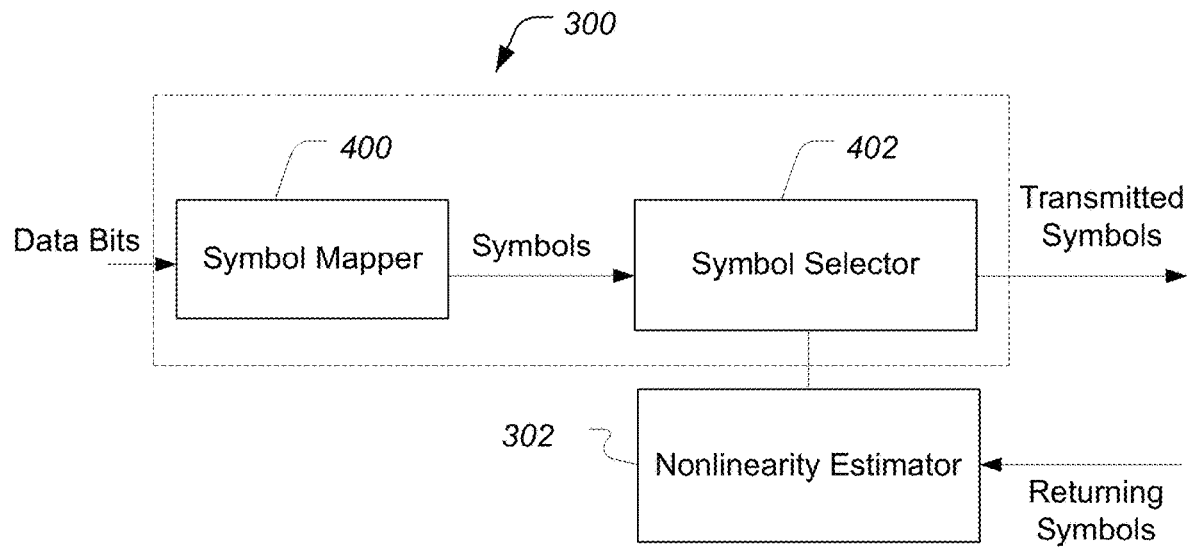
FIGS. 4A-4B show example configurations including a symbol mapper/selector and a nonlinearity estimator.

FIG. 4A shows an example configuration including a symbol mapper/selector 300 and a nonlinearity estimator 302. In an implementation, the symbol mapper/selector 300 may include a symbol mapper 400 and a symbol selector 402. The symbol mapper 400 maps a training sequence into symbols to be transmitted to a receiver, and the symbol selector 402 selects, among the symbols to be transmitted to the receiver, one or more symbols that meet the predetermined nonlinearity criteria. The symbol mapper/selector 300 transmits only the selected symbols to a receiver and receives symbols returning from the receiver. The nonlinearity estimator 302 characterizes nonlinearity in an optical communication and estimates an amount of symbol distortion caused by the nonlinearity based on returning symbols.

Figure 4B:
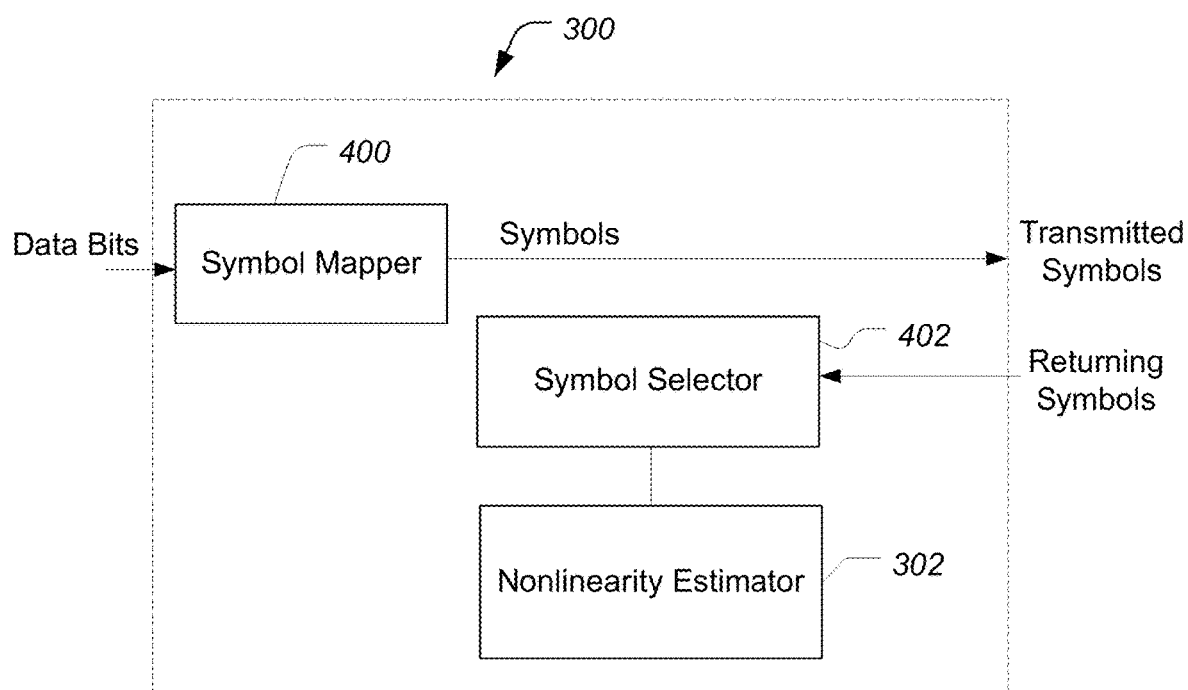

FIG. 4B shows another example configuration including the symbol mapper/selector 300 and the nonlinearity estimator 302. In another implementation, the symbol mapper 400 maps a training sequence into symbols, and all the symbols are transmitted to the receiver. The symbol selector 402 selects, among returning symbols that are transmitted from the receiver in response to the symbols transmitted to the receiver, one or more symbols that meet the predetermined nonlinearity criteria. The nonlinearity estimator 302 characterizes nonlinearity in an optical communication and estimates an amount of symbol distortion caused by the nonlinearity based on returning symbols.

Figure 5:
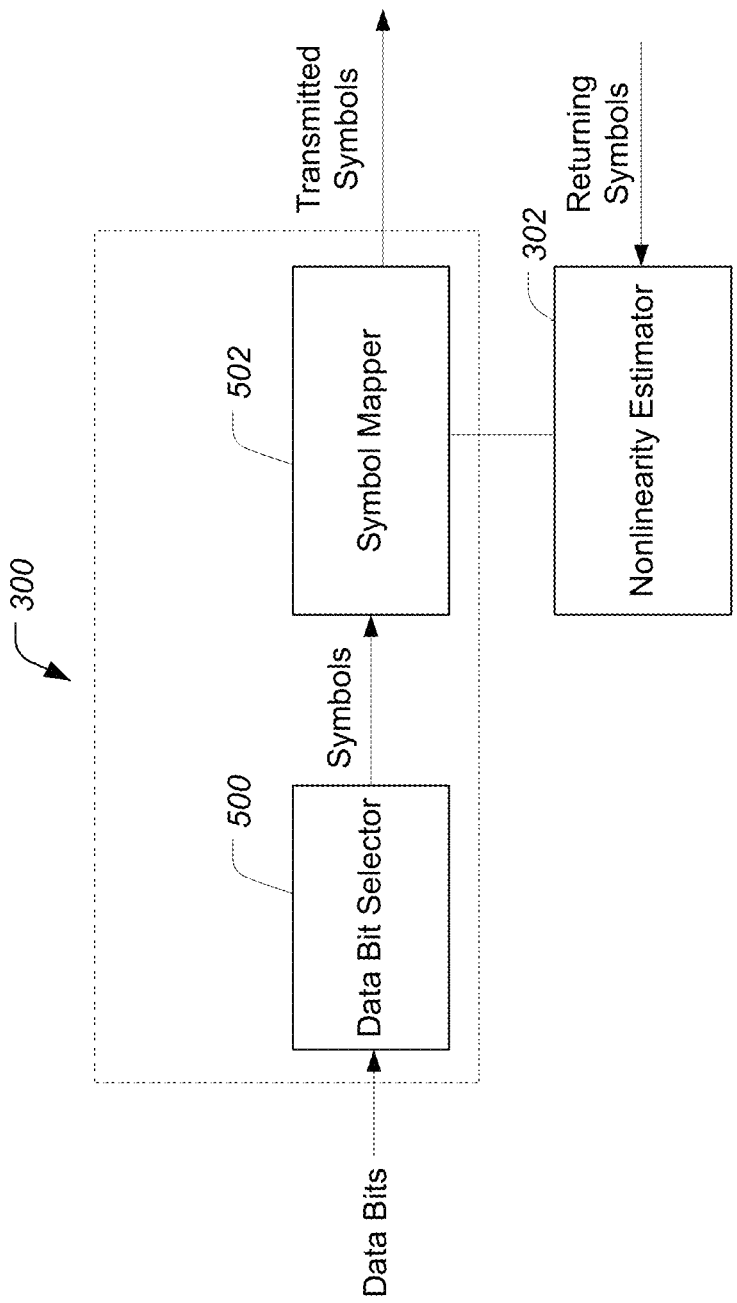
FIG. 5 shows another example configuration including a symbol mapping/selector and a nonlinearity estimator.

FIG. 5 shows another example configuration including a symbol mapper/selector 300 and a nonlinearity estimator 302. In another implementation, the symbol mapper/selector 300 includes a data bit selector 500 and a symbol mapper 502. The data bit selector 500 selects, out of a training sequence, certain data bits to be converted into symbols that meet predetermined nonlinearity criteria, and the symbol mapper 502 maps the selected data bits into the symbols that meet the predetermined nonlinearity criteria. The nonlinearity estimator 302 characterizes nonlinearity in an optical communication and estimates an amount of symbol distortion caused by the nonlinearity based on returning symbols.

Figure 6:
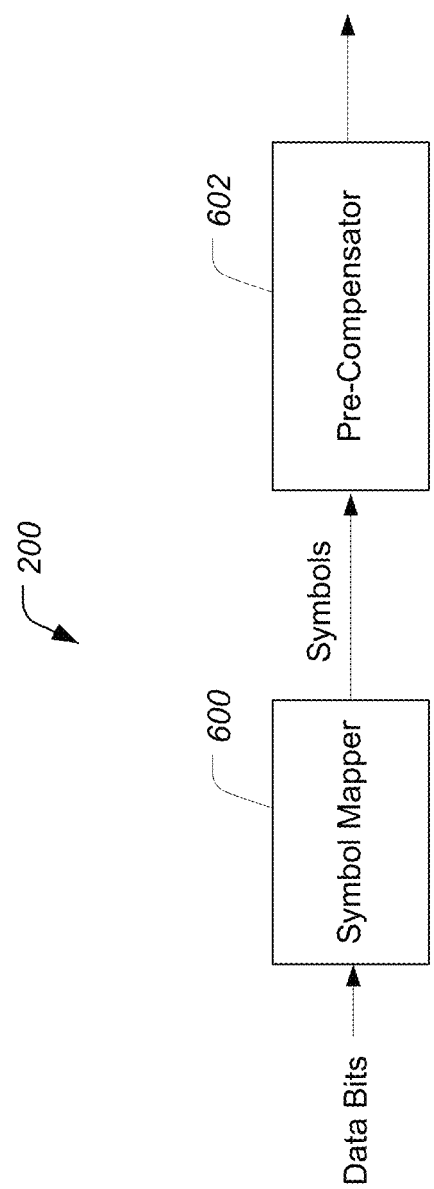
FIG. 6 is another example implementation of a modulation signal generator including a symbol mapper and a pre-compensator.

FIG. 6 illustrates an example implementation of the modulation signal generator 200 that includes a symbol mapper 600 and a pre-compensator 602. The symbol mapper 600 generates symbols by mapping data bits into symbols. The symbols are transmitted to the optical receiver 104, and returning symbols are transmitted from the optical receiver to the optical transmitter 100. In some implementations, the symbol mapper 600 may map the input data bits to multi-level PAM or multi-level QAM. The data bits may be information bits such as user data, or control data generated by one or more users of the optical communication network.

The pre-compensator 602 performs a nonlinearity pre-compensation based on the look-up table technique. The nonlinearity can be characterized in form of look-up tables that record the averaged symbol distortion as a function of a set of unique pattern indexes. The length and amount of the unique patterns may be governed by memory sizes and modulation levels, respectively. The pre-compensation may be based on a single look-up table that is dependent on a single transmission channel, or it may be based on multiple look-up tables that are used in an optical network that has multiple transmission channels, with each transmitter-receiver having its own look-up table. Provided PAM-8 is used and the number of look-up table symbols is three (3), the modulation signal generator 200 will produce $8^3$ patterns.

The pre-compensator 602 may also generate the look-up tables. During a training phase, a training sequence with a certain length may be provided to generate the look-up tables. The training sequence is converted into a training sequence symbol pattern and transmitted to a receiver in a back-to-back connection. The transmitted symbol pattern is processed at the receiver by equalization algorithms such as cascaded multi-modulus algorithm (CMMA) and decision-directed least mean square (DD-LMS), and then returns to the pre-compensator 602. A certain logic in the pre-compensator 602 may generate the look-up tables by comparing the training sequence symbol pattern with the returning symbol pattern.

Figure 7:
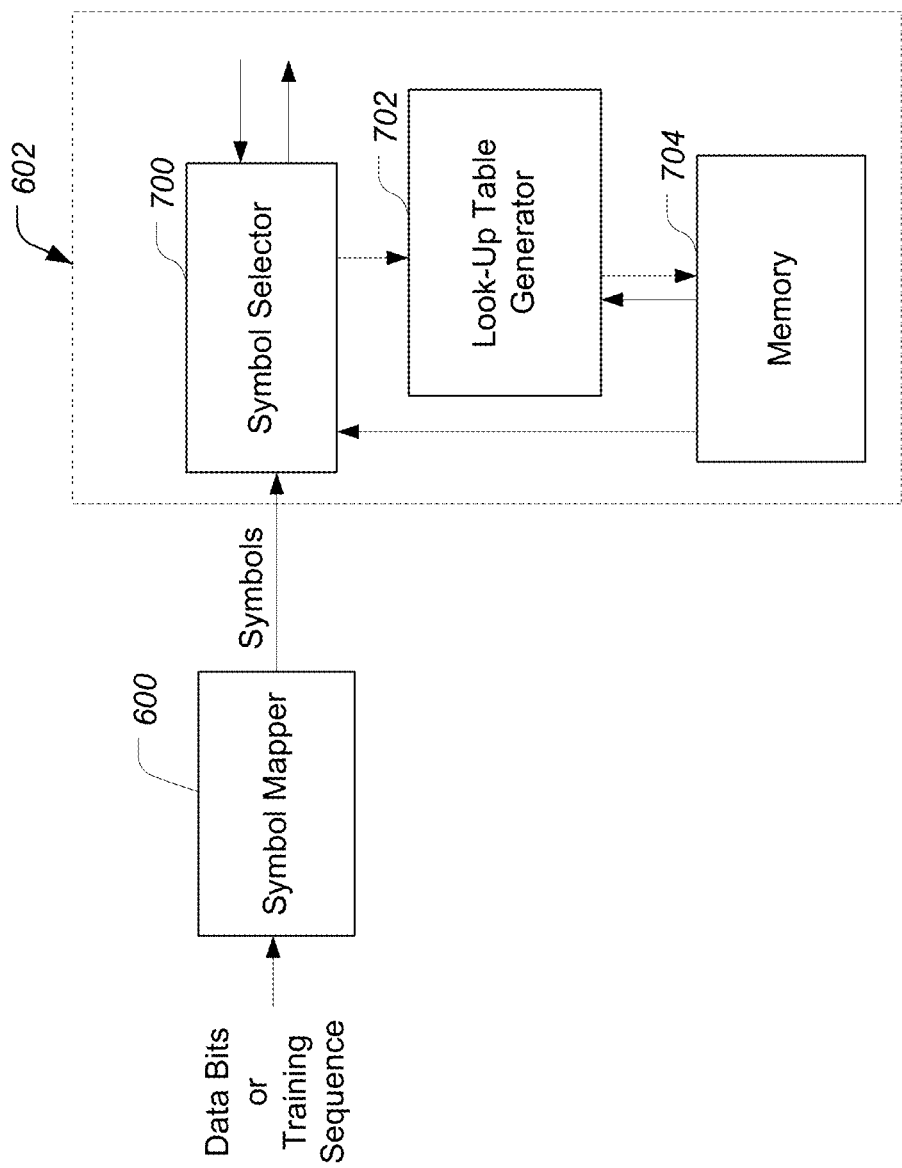
FIG. 7 is an example implementation of a pre-compensator.

FIG. 7 illustrates an example implementation of the pre-compensator 602. The pre-compensator 602 may compensate errors in symbols that are expected to be caused by various electrical components and optical fibers while the symbols are being transmitted to the optical receiver 104. In some implementations, a pre-distortion technique may be used to compensate nonlinearity at the optical transmitter 100. The technique may include estimating the optical system's nonlinearity based on training sequences, and then offsetting that amount of nonlinearity at the optical transmitter 100. In pre-compensating nonlinearity, the pre-compensator 602 utilizes a look-up table technique. In some implementations, the look-up table technique may generate look-up tables based only on high-level symbols that are more susceptible to electro-optical components nonlinear impairment than low-level symbols. Throughout this document, high-level symbols represent symbols that have relatively high amplitude values. For example, in a case where the training sequences are modulated into eight symbols (±1, ±3, ±5, ±7) by PAM-8 modulation technique, the symbols may be divided into high-level symbols and low-level symbols depending on the amplitude of the symbol, and the pre-compensator 302 may select the high-level symbols (±5, ±7) and generate the look-up tables based on the selected symbols. In some implementations, the pre-compensator 602 may include a symbol selector 700, a look-up table generator 702, and a memory 704. The symbol selector 700 selects high-level symbols, between high-level symbols and low-level symbols, and the look-up table generator 702 generates the look-up table based only on the selected symbols, thereby reducing the number of look-up table patterns by half while maintaining its error compensation performance. The pre-compensator 602 in accordance with this implementation may also reduce the number of look-up table patterns by half in higher order modulation techniques (e.g., PAM-16, 32, 64 . . . , or 128QAM, 256QAM, 1024QAM, etc.). The look-up tables generated by the look-up table generator 702 may be stored in the memory 704.

Figure 8:
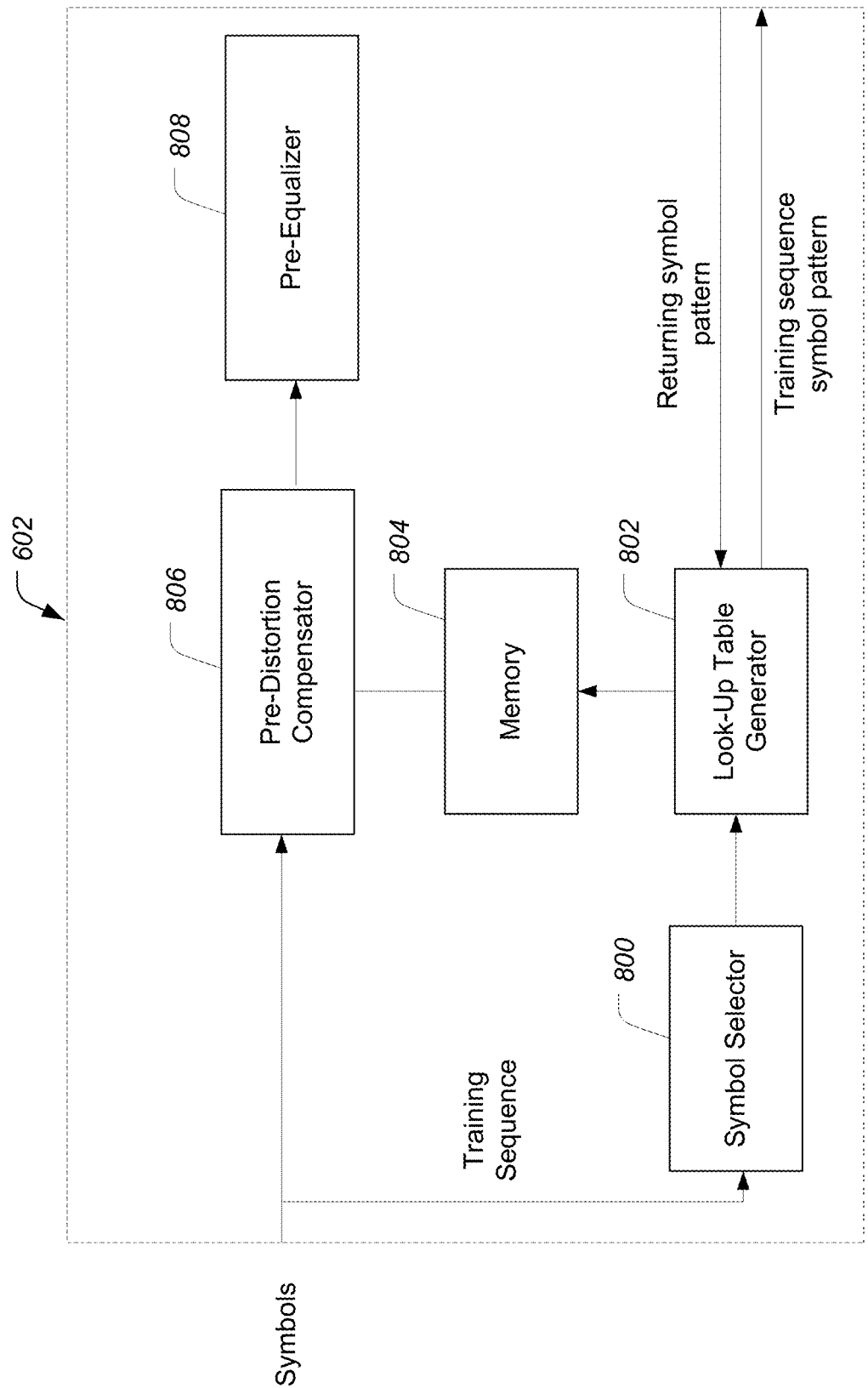
FIG. 8 is another example implementation of a pre-compensator.

FIG. 8 illustrates another example implementation of the pre-compensator 602. The pre-compensator 602 may include a symbol selector 800, a look-up table generator 802, a memory 804, a pre-distortion compensator 806, and a pre-equalizer 808. The pre-compensator 602 may perform a pre-distortion and a pre-equalization, and may generate the look-up tables. In some implementations, the symbol selector 800 selects high-level symbols out of the training sequence symbol pattern, and the look-up table generator 802 generates the look-up tables based on the selected symbols. The selected symbol pattern is transmitted to the receiver and processed at the receiver by equalization algorithms such as cascaded multi-modulus algorithm (CMMA) and decision-directed least mean square (DD-LMS). The symbol pattern processed at the receiver returns to the and then returns to the look-up table generator 502, in which the look-up tables are generated by comparing the training sequence symbol pattern with the returning symbol pattern. The look-up tables are stored in the memory 804, and the pre-distortion compensator 806 refers to the look-up tables stored in the memory 804 when performing a pre-distortion.

In an implementation, the pre-equalizer 808 may use a decision-directed least-mean-square (DD-LMS) equalization technique. In another implementation, the pre-equalizer 808 may use any error minimization technique such as least-mean-square (LMS) error minimization techniques. The DD-LMS equalization technique may reduce/minimize error vector between estimates of symbols and ideal symbols (e.g., known training symbols) based on minimum mean square error of the differences between the symbols. In some implementations, the pre-compensator 602 may be a DD-LMS equalizer that contains an adaptive finite impulse response (FIR) filter with tap coefficients updated by the LMS algorithm.

Figure 9:
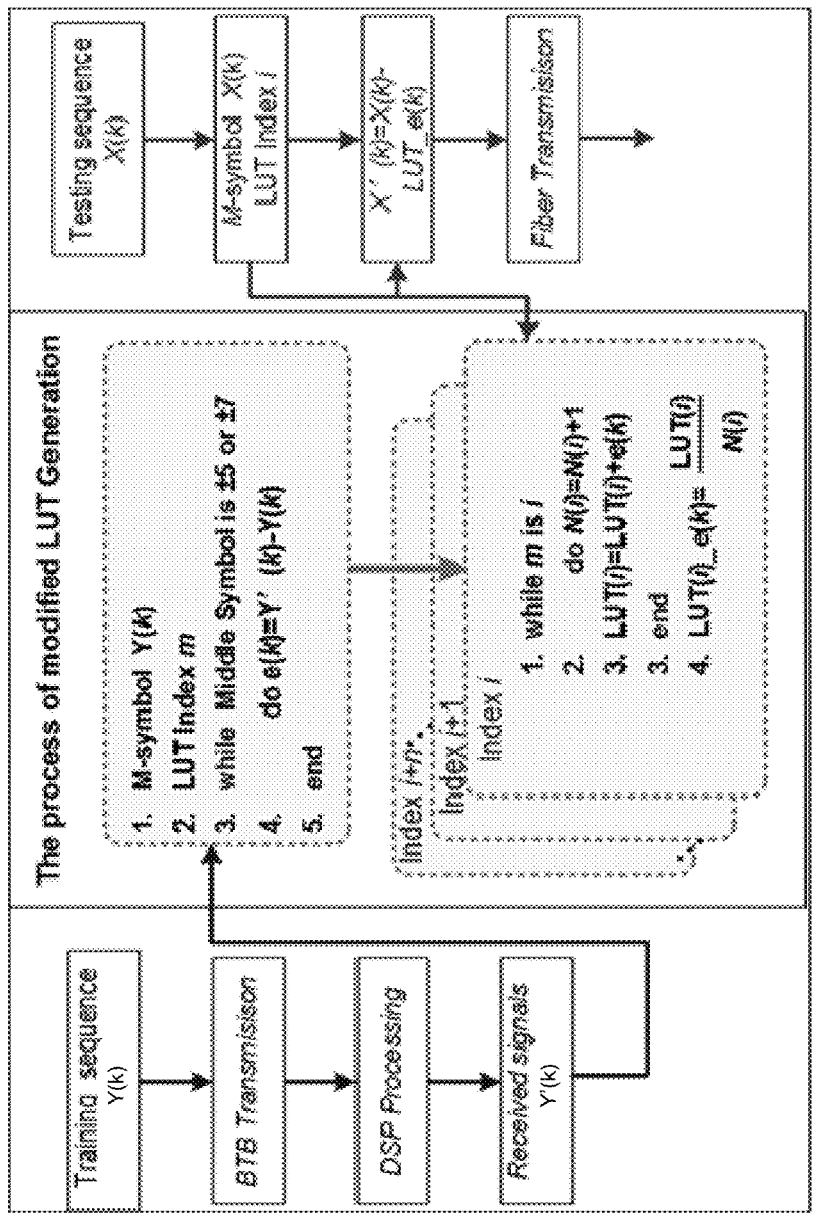
FIG. 9 is an example implementation for generating look-up tables for non-linear compensator.

Referring to FIG. 9, for non-linear compensation purposes, look-up tables (LUT) are generated as follows. A PAM-8 training sequence Y(k) that has eight symbols (i.e., ±1, ±3, ±5, ±7) with a certain length is transmitted from a transmitter to a receiver in a back-to-back connection. After cascaded multi-modulus algorithm (CMMA) and decision-directed least mean square (DD-LMS) algorithm processing, signals Y'(k) covering all possible patterns are received. A symbol sequence containing a certain pattern is extracted from the PAM-8 signal Y(k) with corresponding look-up table index m. When a middle symbol of the sequence is ±5 or ±7, e(k) values can be calculated by subtracting the training sequence Y(k) from the recovered signals Y'(k). Then, each look-up table with index "i" LUT(i) can be calculated by adding each e(k) value to the same look-up table with index "i." Finally, the look-up tables with index "i" LUT(i) are averaged to obtain LUT(i)_e(k). Here, N(i) is the total number of values under the same look-up table index "i." In addition, testing PAM-8 pre-distortion signals X'(k)=X(k)−LUT_e(k) can be obtained by searching tables according to index "i."

For example, where a PAM-8 pattern [−7, −5, −3, −1, 1, 3, 5, 7, −7, −5, −3, −1, 1, 3, 5, 7] is transmitted in the back-to-back connection to obtain three-bit look-up tables, fourteen look-up table patterns [−7,−5,−3], [−5,−3,−1], [−3,−1,1], [−1,1,3], [1,3,5], [3,5,7], [5,7,−7], [7,−7,−5], [−7,−5,−3], [−5,−3,−1], [−3,−1,1], [−1,1,3], [1,3,5], and [3,5,7] are obtained when the look-up table is generated based on all the eight symbols, whereas eight look-up table patterns [−7,−5,−3], [3,5,7], [5,7,−7], [7,−7,−5], [−7,−5,−3], and [3,5,7] are obtained when the look-up table is generated based only on high-level symbols (±5, ±7).

Figure 10:
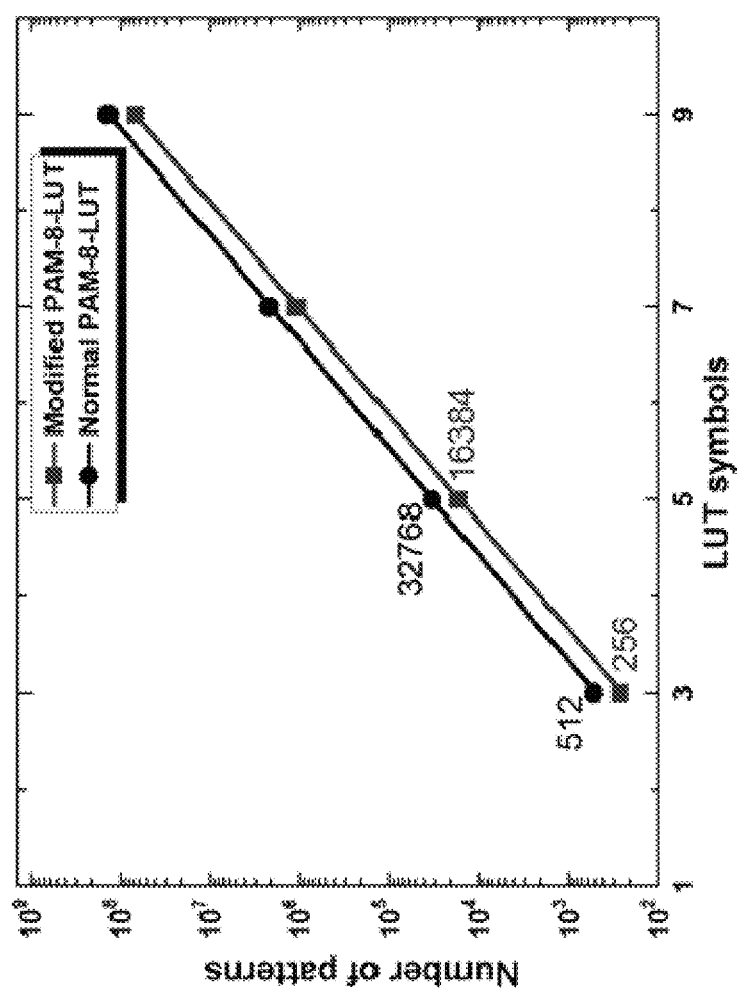
FIG. 10 shows a comparison of the number of patterns of PAM-8 look-up tables generated based on all the symbols and look-up tables generated based only on high-level symbols.

FIG. 10 shows a comparison of the number of patterns of the PAM-8 that are generated based on all the eight symbols and the number of patterns of the PAM-8 that are generated based only on high-level symbols. When the number of look-up table symbols is three (3), the PAM-8 look-up table that is generated based on all the eight symbols produces 512 patterns, whereas the PAM-8 look-up table that is generated based only on high-level symbols produces 256 patterns. When the number of look-up table symbols is five (5), the PAM-8 look-up table that is generated based on all the eight symbols produces 32768 patterns, whereas the PAM-8 look-up table that is generated based only on high-level symbols produces 16384 patterns.

Figure 11:
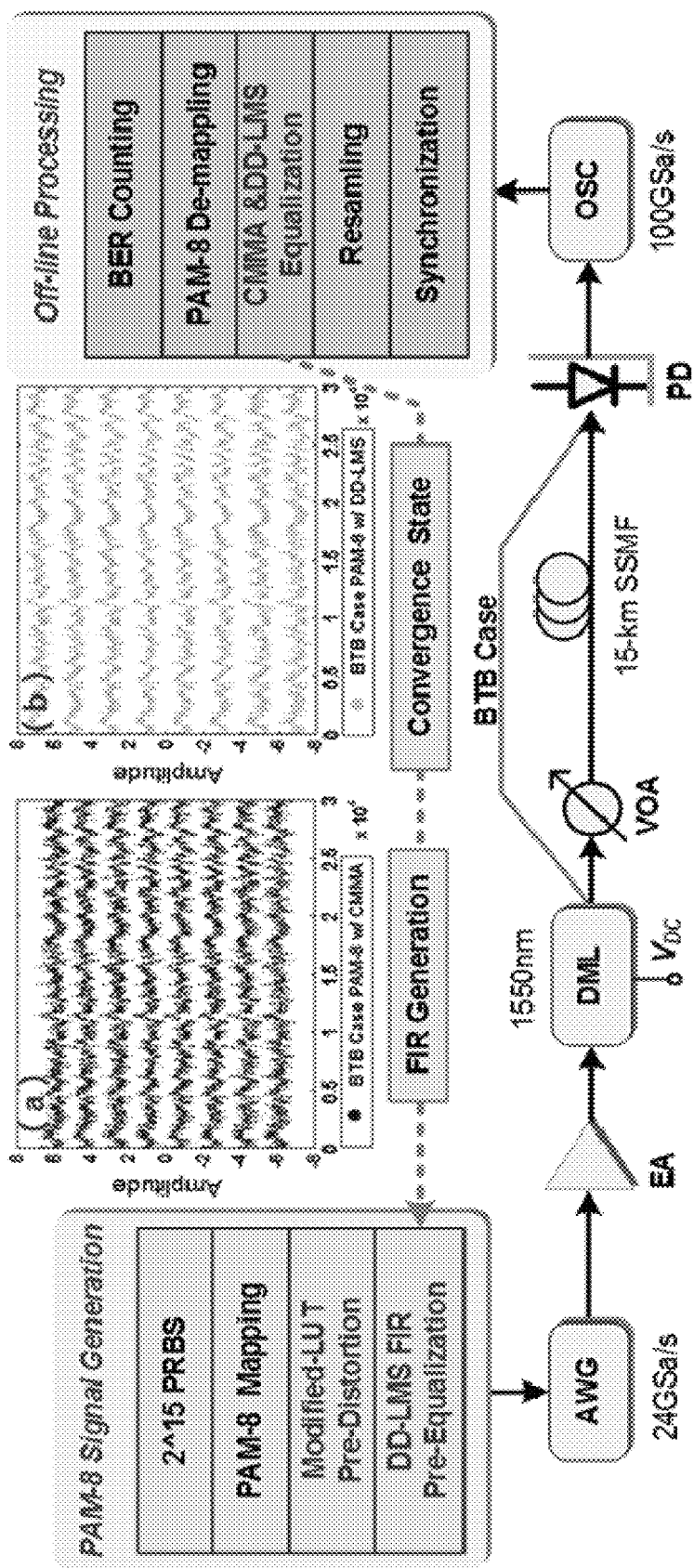
FIG. 11 shows an experimental setup for intensity modulation/direct detection (IM/DD) PAM-8 based on directly modulated laser (DML) over 15-km standard single mode fiber (SSMF) transmission.

FIG. 11 shows an experimental setup for intensity modulation/direct detection (IM/DD) PAM-8 based on directly modulated laser (DML) over 15-km standard single mode fiber (SSMF) transmission. For simplification purposes, this implementation example will be discussed based on PAM-8 modulation technique. Firstly, a pseudorandom binary sequence (PRBS) is generated and mapped into symbols using the PAM-8 modulation technique. The pre-distortion and the pre-equalization may be performed on the symbols before a fiber transmission testing in a back-to-back connection. The resulting signal is then converted from digital to analog by an arbitrary waveform generator (AWG). At a receiver side, synchronization and resampling are performed on the optical signal received in the back-to-back connection. After cascaded multi-modulus algorithm (CMMA) and decision-directed least mean square (DD-LMS) algorithm processing, the finite impulse response (FIR) for the pre-equalization can be calculated from DD-LMS filters after convergence in the back-to-back connection. Subsequently, a pre-equalization is performed by a DD-LMS equalizer that contains the FIR filter with tap coefficients updated by the LMS algorithm. The corresponding PAM-8 symbols after CMMA and DD-LMS equalization are shown in diagrams (a) and (b), respectively. Then, the look-up table can be generated under different pattern sequences with M-symbols by using the look-up table generation method using only high-level symbols.

Figure 12A:
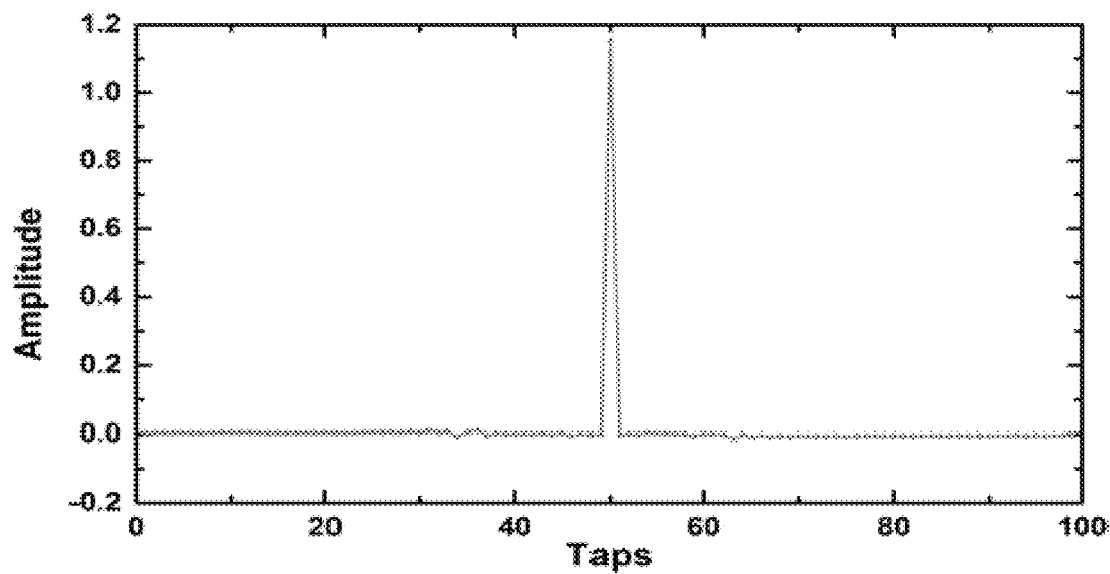
FIG. 12A shows a finite impulse response (FIR) of decision-directed least-mean-square (DD-LMS) for pre-equalization.
Figure 12B:
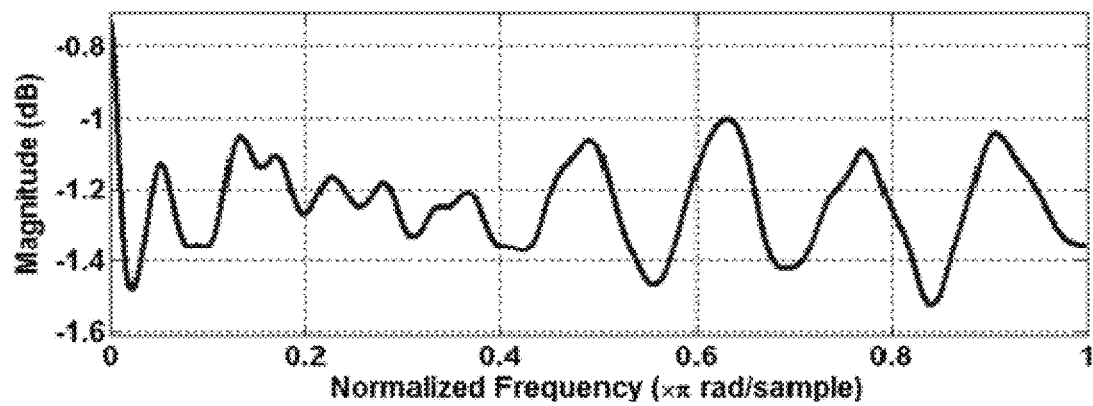
FIGS. 12B and 12C show frequency responses of DD-LMS equalizer before and after pre-equalization.
Figure 12C:
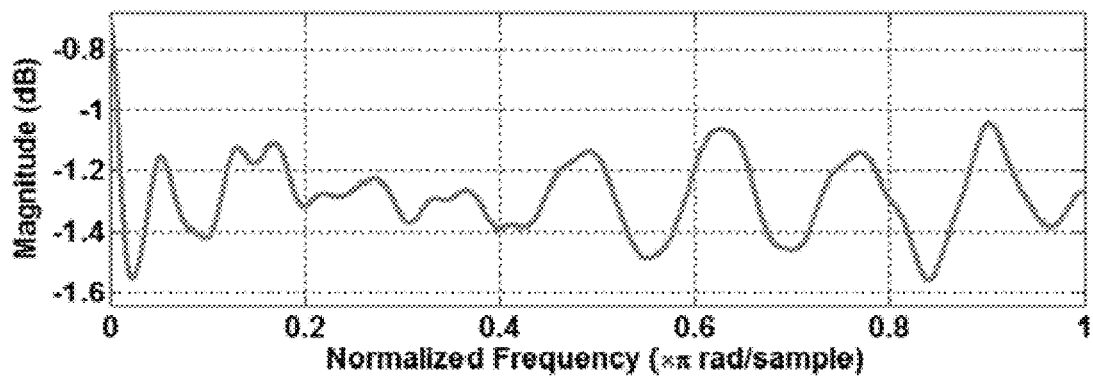

FIG. 12A shows a finite impulse response (FIR) of decision-directed least-mean-square (DD-LMS) for pre-equalization, FIG. 12B shows a frequency response of DD-LMS equalizer before pre-equalization, and FIG. 12C shows a frequency response of DD-LMS equalizer after pre-equalization. After the pre-equalization, the channel response shows a flat response.

Figure 13A:
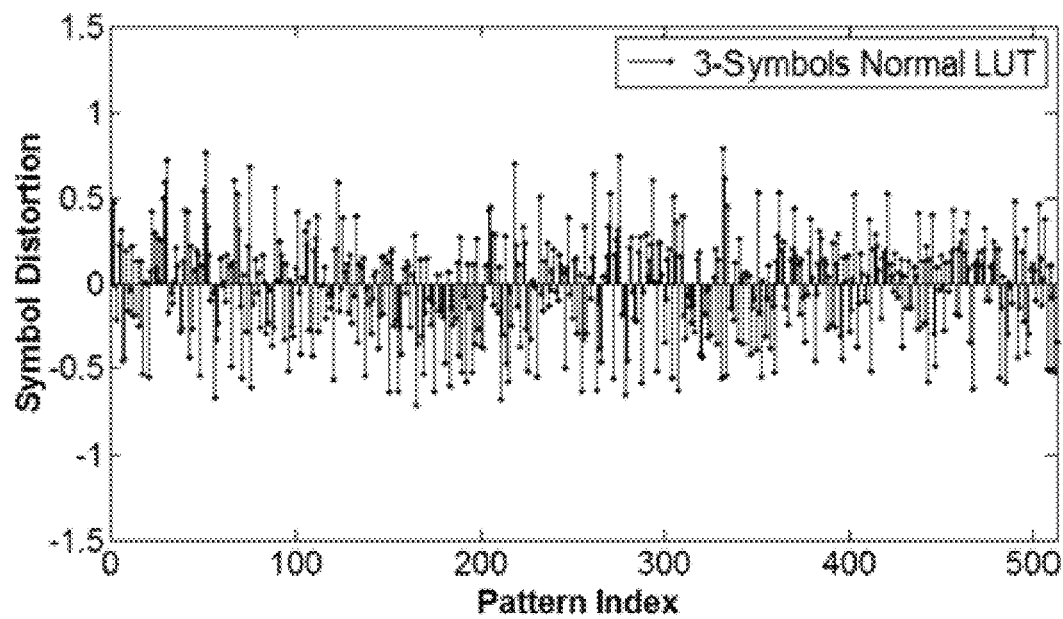
FIGS. 13A-13B show an example look-up table generation with 3-Symbol using look-up tables generated based on all the symbols (FIG. 13A) and look-up tables generated based only on high-level symbols (FIG. 13B).
Figure 13B:
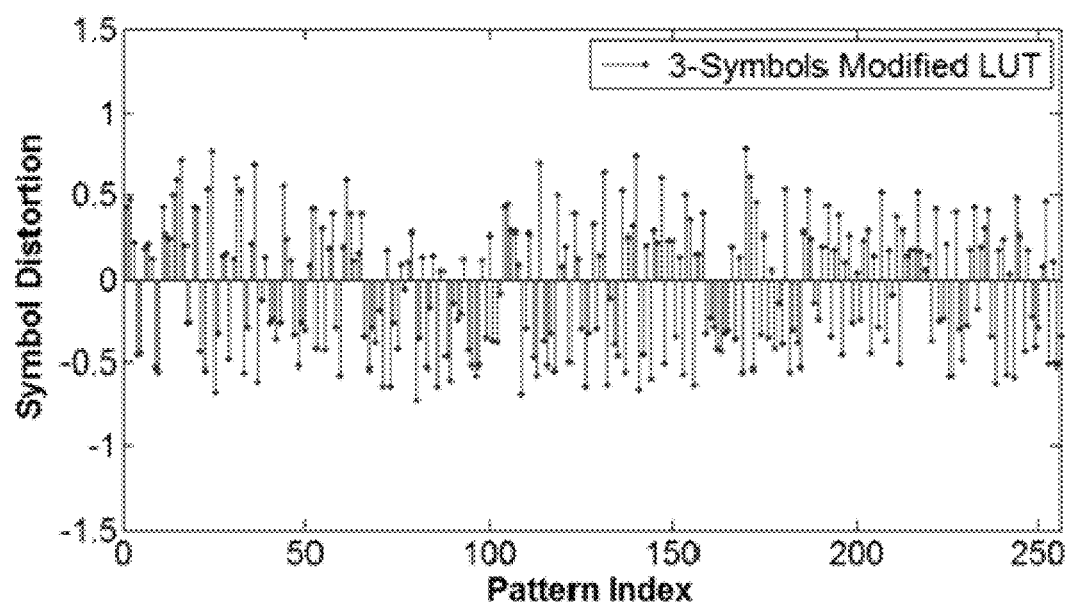

FIGS. 13A and 13B show look-up table generation with 3-Symbol using FIG. 13A look-up tables generated based on all the symbols and FIG. 13B look-up tables generated based only on high-level symbols. By using only high-level symbols, the number of the pattern indexes may be reduced by half.

Figure 14B:
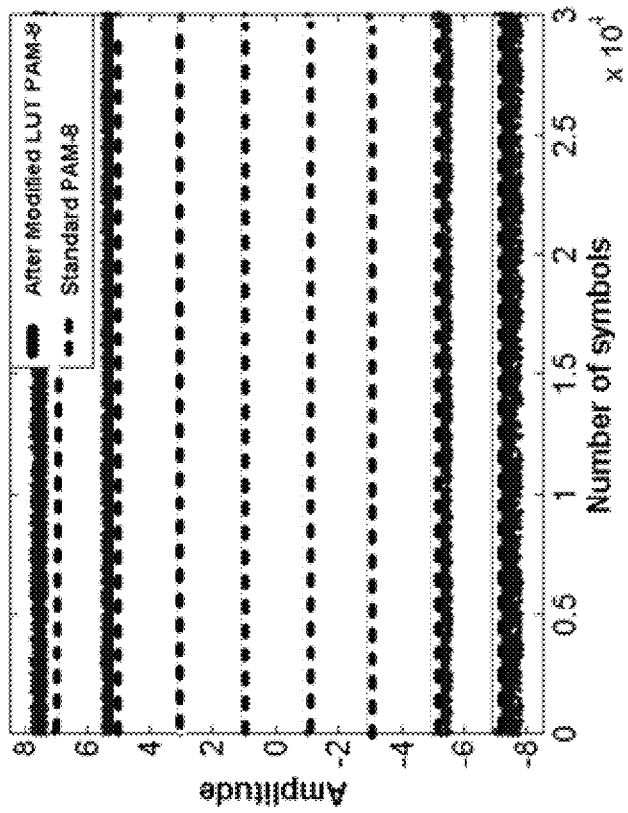
FIGS. 14A-14B show PAM-8 symbol constellation obtained by look-up tables generated based on all the symbols (FIG. 14A) and look-up tables generated based only on high-level symbols (FIG. 14B).
Figure 14A:
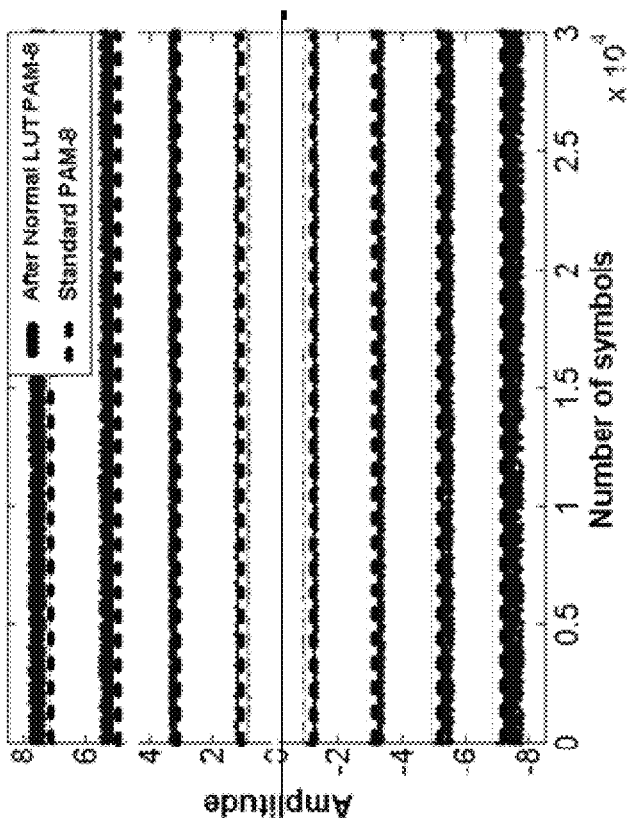

FIGS. 14A and 14B show PAM-8 symbol constellation obtained by FIG. 14A look-up tables generated based on all the symbols and FIG. 14B the look-up table generation method using only high-level symbols. For PAM-8 modulation signals, high-level symbols (±5, ±7) are more susceptible to electro-optical components nonlinear impairment than low-level symbols (±1, ±3). In creating look-up tables, a computational complexity can be reduced by focusing on symbols susceptible to nonlinear impairment. As can be seen here, however, the look-up table generation method using only high-level symbols does not harm the ability of look-up tables to perform the non-linear compensation.

Figure 15:
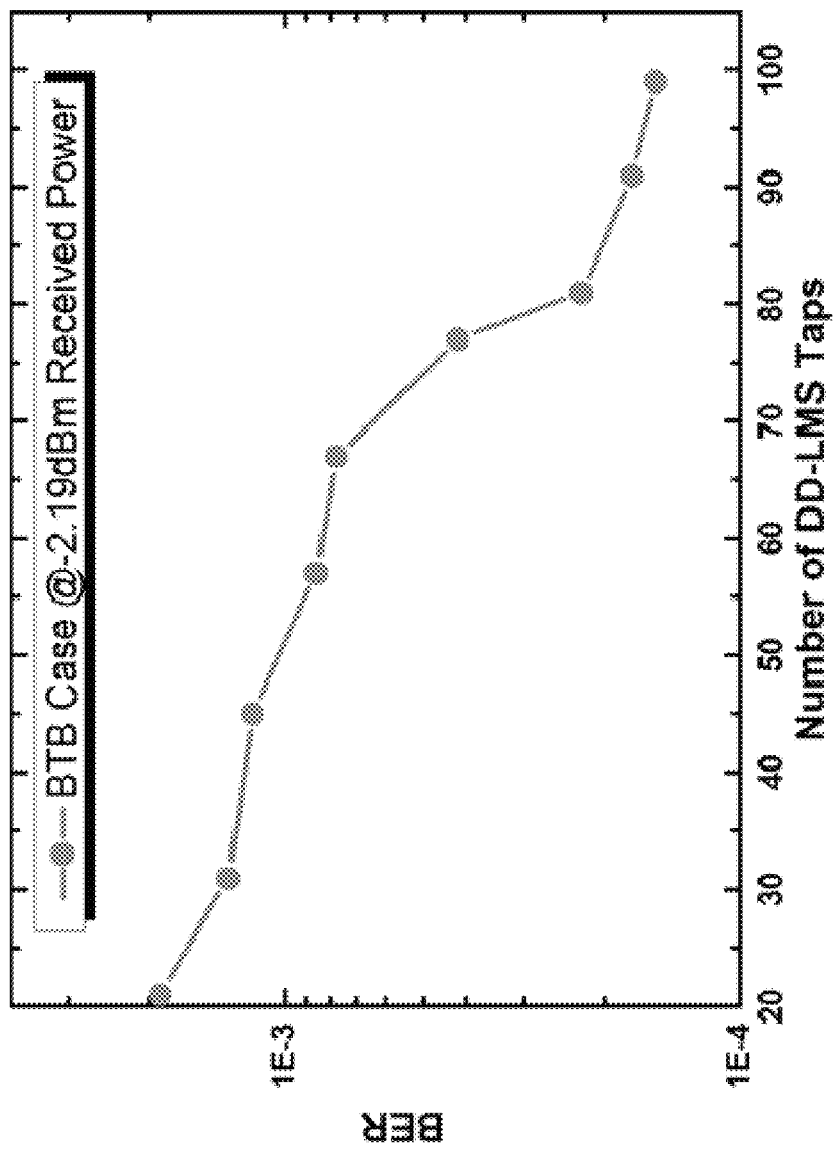
FIG. 15 shows a graph of bit error rate (BER) versus the number of DD-LMS taps obtained after pre-equalization in a back-to-back connection.

FIG. 15 shows a graph of bit error rate (BER) versus the number of DD-LMS taps obtained after pre-equalization at −2.19 dBm received power in a back-to-back connection. The BER decreases along with the increase in the number of DD-LMS FIR taps. Here, the number of DD-LMS FIR taps is 99 for the fiber transmission measurement.

FIG. 16A shows graphs of BER versus baud rate in various situations, FIG. 16B shows PAM-8 symbol constellation obtained by look-up tables generated based only on high-level symbols, and FIG. 16C shows PAM-8 symbol constellation obtained by look-up tables generated based on all the symbols. As can be seen here, a lower BER can be obtained by using both the look-up tables and the pre-equalization at a lower baud rate, and the look-up table generation method using only high-level symbols does not deteriorate the BER compared to the look-up table generation method using all symbols.

FIG. 17A shows graphs of BER versus received optical power in various situations, FIG. 17B shows PAM-8 symbol constellation obtained by look-up tables generated based only on high-level symbols, and FIG. 17C shows PAM-8 symbol constellation obtained by look-up tables generated based on all the symbols. Likewise, a lower BER can be obtained by using both the look-up tables and the pre-equalization at a higher received power, and the look-up table generation method using only high-level symbols does not deteriorate the BER compared to the look-up table generation method using all symbols.

When performing the pre-distortion process, the pre-compensator disclosed in this document selects the high-level symbols and generates the look-up tables based on the selected symbols. The look-up table generation method generates look-up tables based only on higher symbols (e.g., half of the total symbols that have high-level symbol values), thereby reducing the computational complexity. The nonlinearity pre-compensation performed by the look-up tables generated based on the selected symbols is, however, similar to that performed by the look-up tables generated based on all the symbol. This look-up table generation method can be used in any PAM or QAM modulation format transmission system to reduce computational complexity. In an experimental setup, about 0.5-dB receiver sensitivity improvement can be obtained by using pre-equalization only, and about 1-dB receiver sensitivity improvement at BER of 3.8×10-3 is achieved by adopting the look-up table method together with pre-equalization over 15 km transmission under 2 GBaud based on DML. For lower baud rate or higher received optical power, the improvement effect in the nonlinearity pre-compensation is more obvious.

Figure 18:
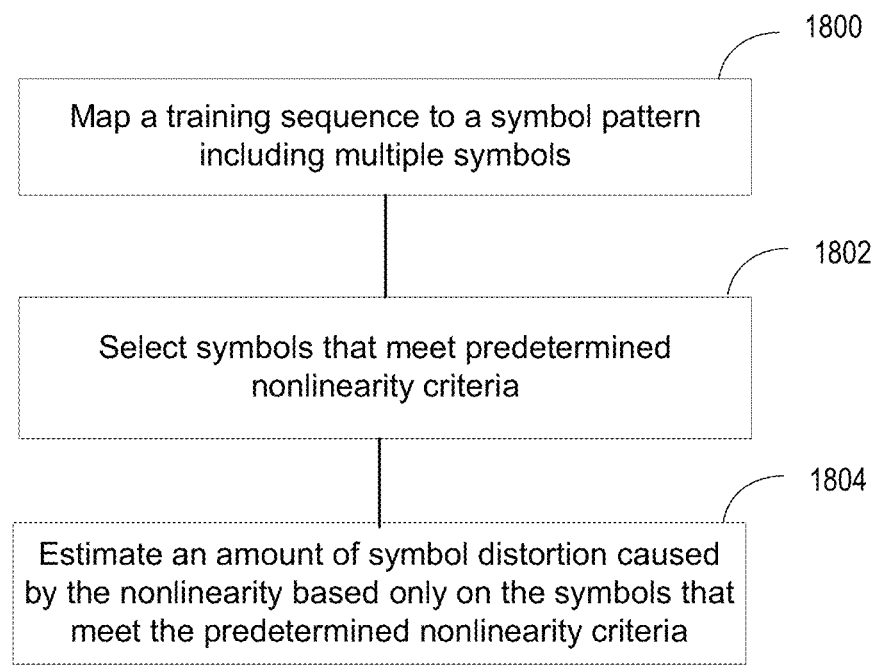
FIG. 18 is a flowchart representation of an example method of estimating nonlinearity in an optical communication.

FIG. 18 is a flowchart representation of an example method of estimating nonlinearity in an optical communication. During a training phase, training sequences are provided and mapped to multiple symbols at a transmitter (1800). The training sequences may be mapped to a sequence of pulse amplitude modulation (PAM) symbols or quadrature amplitude modulation (QAM) symbols. In estimating an amount of symbol distortion caused by the nonlinearity, only certain symbols are used. In an implementation, certain symbols that meet predetermined nonlinearity criteria are selected (1802). For example, using the nonlinearity criteria, symbols that susceptible to nonlinear impairment are selected. The symbols may be, for example, constellations or levels of modulation above a certain threshold. Here, the symbol selection may be made on the training sequence to be transmitted to a receiver. Alternately, the symbol selection may be made on a returning symbol sequence transmitted from the receiver. In the embodiment where symbols that meet predetermined nonlinearity criteria are selected among the symbols to be transmitted to the receiver, only selected symbols are transmitted to the receiver, and then the transmitter receives symbols generated by the receiver in response to the selected symbols. In the embodiment where the training sequence is transmitted to the receiver, the symbols that meet predetermined non-linearity criteria are selected among returning symbols that are transmitted from the receiver in response to the training sequence transmitted to the receiver. In both embodiments, an amount of symbol distortion caused by the nonlinearity may be estimated based only on the symbols that meet the predetermined nonlinearity criteria.

Figure 19:
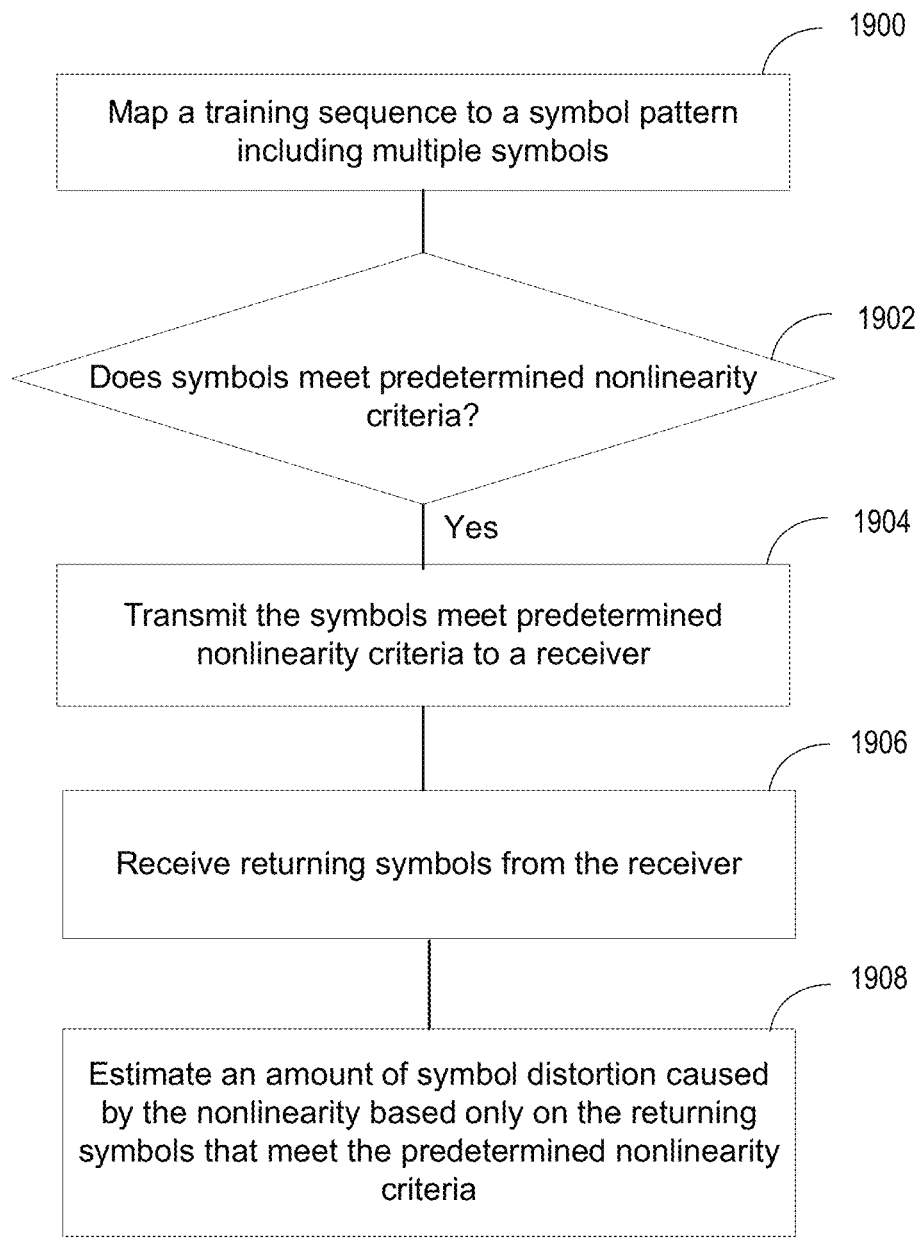
FIG. 19 is a flowchart representation of another example method of estimating nonlinearity in an optical communication.

FIG. 19 is a flowchart representation of an example method of estimating nonlinearity in an optical communication. During a training phase, training sequences are provided and mapped to multiple symbols at a transmitter (1900). Subsequently, symbols that meet predetermined nonlinearity criteria are selected (1902) among the symbols to be transmitted to the receiver. For example, symbols that susceptible to nonlinear impairment are selected. Here, the symbol selection may be made on the training sequence to be transmitted to a receiver (1904). Only selected symbols are transmitted to the receiver, and then the transmitter receives symbols generated by the receiver in response to the selected symbols (1906). Subsequently, an amount of symbol distortion caused by the nonlinearity may be estimated based only on the symbols that meet the predetermined nonlinearity criteria (1908).

Figure 20:
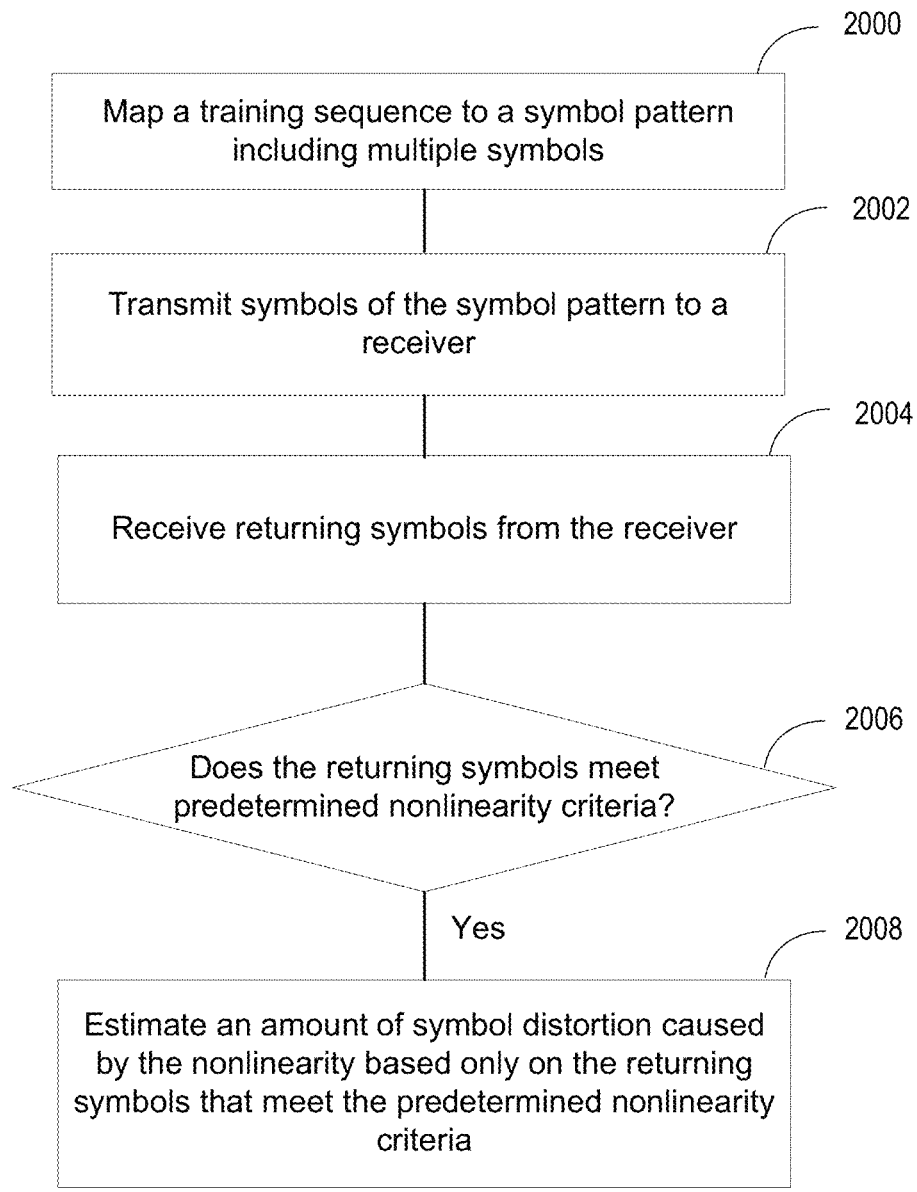
FIG. 20 is a flowchart representation of yet another example method of estimating nonlinearity in an optical communication.

FIG. 20 is a flowchart representation of yet another example method of estimating nonlinearity in an optical communication. During a training phase, training sequences are provided and mapped to multiple symbols at a transmitter (2000). The symbols of the training sequence are transmitted to a receiver (2002), and returning symbols are transmitted from the receiver to the transmitter (2004). In an implementation, the symbol selection may be made on a returning symbol sequence transmitted from the receiver (2006). Returning symbols are generated by the receiver in response to the training sequence transmitted to the receiver, and are transmitted to the transmitter. Subsequently, symbols that meet predetermined nonlinearity criteria are selected among the returning symbols (2006), and then an amount of symbol distortion caused by the nonlinearity may be estimated based only on the selected symbols (2008).

In an implementation, the selected symbols are used in generating the look-up tables. The look-up tables are generated by comparing the symbol patterns including the selected symbols with the returning symbol patterns, and then are stored in a memory to be used in a pre-distortion process. The look-up tables are generated as follows. An index to a look-up table is identified. According to the index, a symbol sequence is extracted from the transmitting symbol pattern consisting of the high-level symbols. Subsequently, an error value between the transmitting symbol pattern and the returning symbol pattern is determined by subtracting the transmitting symbol pattern from the returning symbol pattern. The error value is added to the look-up table with the index, and all the look-up table values are averaged.

The above-described methods may include an operation of performing a non-linearity pre-compensation to the sequence of PAM or QAM symbols. Here, the operation of performing the non-linearity pre-compensation may include the use of a look-up table in which for a given PAM or QAM symbol in the sequence of PAM or QAM symbols, an index to the look-up table is identified and then value of the PAM or QAM symbol is adjusted based on the index. The look-up table may be generated by the transmitter by exchanging messages with a receiver during a training phase. In some implementations, the transmitter may maintain a single look-up table that is used for adjusting values of transmitted PAM or QAM symbols to be sent to one or more optical receivers connected to the transmitter via an optical communication channel. The transmitter may store the one or more look-up tables in a local memory for future use after the training phase.

In some implementations, the adjustment of value of the PAM or QAM symbols may be performed by referring to look-up tables generated based only on certain selected symbols. Thus, the look-up table generation disclosed in this document includes a symbol selecting step (1502) for selecting certain symbols that are more susceptible to nonlinear impairment, in order to use the selected symbols in generating the look-up table. For example, where a PAM-8 with eight symbols (i.e., ±1, ±3, ±5, ±7) is used, the look-up table is generated based only on high-level symbols (±5, ±7) because these symbols are more susceptible to nonlinear impairment than low-level symbols (±1, ±3). When generating the look-up tables, one or more known symbol patterns may be provided as the training sequence. The generation of the look-up tables may include determining an error component by comparing the symbol estimates with the one or more known symbol patterns, and averaging the error component to build a look-up table indicative of a pre-compensation correction to mitigate the error component.

In an implementation, the multiple symbols are divided into high-level symbols and low-level symbols, and the high-level symbols are selected to be used in generating the look-up tables because they are susceptible to nonlinear impairment and thus the look-up tables depend most significantly on the high-level symbols. The look-up tables are generated based only on the high-level symbols by comparing transmitted high-level symbols with returning high-level symbols. Specifically, an index to a look-up table is identified, and according to the index, a symbol sequence is extracted from the transmitting symbol pattern including the high-level symbols. Subsequently, an error value between the transmitted symbol pattern and the returning symbol pattern is determined by subtracting the transmitted symbol pattern from the returning symbol pattern. The error value is added to the look-up table with the index, and all the look-up table values are averaged. Finally, the look-up tables are stored in a memory to be used in a pre-distortion process.

This document discloses techniques for improving performance of an optical communication system by using pre-compensation. In one advantageous aspect, two different pre-compensation stages are used by a transmitter. Data to be transmitted is initially pre-compensated for non-linearity in the transmission path by using look-up tables. Subsequent to this pre-distortion, the pre-equalization is performed. Here, the non-linearity pre-compensation may be operated based on look-up tables that are built during a training phase by averaging over all possible symbol transmission patterns. This document discloses utilizing a modified look-up table technique that generates look-up tables based only on high-level symbols that are more susceptible to electro-optical components nonlinear impairment than low-level symbols.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An optical transmitter apparatus, comprising:
a processor;
a memory coupled to the processor; and
one or more programs, wherein the one or more programs are configured to be executed by the processor, the programs including:
instructions for nonlinearity estimation that characterizes nonlinearity in an optical communication and estimates an amount of symbol distortion caused by the nonlinearity;
instructions for selecting and mapping symbols to provide, for the nonlinearity estimation, only symbols that meet predetermined nonlinearity criteria; and
instructions for storing, in the memory, the amount of symbol distortion to be used for a nonlinearity pre-compensation.

2. The apparatus of claim 1, wherein the instructions for the nonlinearity estimation are performed by referring to look-up tables generated based only on the symbols that meet the predetermined nonlinearity criteria.

3. The apparatus of claim 1, wherein the amount of symbol distortion is represented by look-up tables.

4. The apparatus of claim 1, wherein the instructions for selecting and mapping symbols include instructions for mapping symbols and instructions for selecting symbols, and wherein the instructions for mapping symbols are performed by mapping a training sequence to symbols to be transmitted to a receiver, and the instructions for selecting symbols are performed by selecting, among the symbols to be transmitted to the receiver, one or more symbols that meet the predetermined nonlinearity criteria.

5. The apparatus of claim 1, wherein the instructions for selecting and mapping symbols include instructions for mapping symbols and instructions for selecting symbols, and wherein the instructions for mapping symbols are performed by mapping a training sequence to symbols to be transmitted to a receiver, and the instructions for selecting symbols are performed by selecting, among returning symbols that are transmitted from the receiver in response to the symbols transmitted to the receiver, one or more symbols that meet the predetermined nonlinearity criteria.

6. The apparatus of claim 1, wherein the instructions for selecting and mapping symbols include instructions for selecting data bits and instructions for mapping the selected data bits to symbols, and wherein the instructions for selecting data bits are performed by selecting, out of a training sequence, certain data bits to be converted into symbols that meet predetermined nonlinearity criteria, and the instructions for mapping the selected data bits to symbols are performed by mapping the selected data bits to the symbols that meet the predetermined nonlinearity criteria.

7. An optical transmitter apparatus, comprising:
a symbol mapper that receives data bits to be transmitted and generates multiple symbols containing the data bits therein by mapping the data bits into the symbols; and
a pre-compensator that estimates an amount of symbol distortion caused by nonlinearity in an optical communication to perform a nonlinearity pre-compensation by using the amount of symbol distortion, the pre-compensator comprising:
a symbol selector that selects certain symbols from the generated multiple symbols that meet predetermined nonlinearity criteria to be used in estimating the amount of symbol distortion.

8. The apparatus of claim 7, wherein the pre-compensator further comprising a look-up table generator that generates look-up tables representing the amount of symbol distortion based only on the selected symbols.

9. The apparatus of claim 8, wherein, during a training phase, the symbol mapper receives a training sequence to generate the look-up tables.

10. The apparatus of claim 9, the amount of symbol distortion is estimated based on the certain symbols that meet predetermined nonlinearity criteria in the training sequence.

11. The apparatus of claim 10, wherein the multiple symbols in the training sequence are divided into high-level symbols and low-level symbols, and the symbol selector selects the high-level symbols, as the certain symbols that meet predetermined nonlinearity criteria, for the look-up table generator to generate the look-up tables based only on the high-level symbols.

12. The apparatus of claim 7, wherein the symbol mapper generates the multiple symbols by mapping the data bits to an N-level sequence of PAM symbols, where N is an integer greater than 2.

13. The apparatus of claim 7, wherein the symbol mapper generates the multiple symbols by mapping the data bits to an N-level sequence of QAM symbols, where N is an integer greater than 2.

14. The apparatus of claim 7, wherein the pre-compensator further comprises a pre-equalizer that reduces error vector between estimates of symbols and ideal symbols based on minimum mean square error of the differences between the symbols.

15. A method of estimating nonlinearity in an optical communication, comprising:
mapping a training sequence to a symbol pattern including multiple symbols;
selecting symbols from the symbol pattern that meet predetermined nonlinearity criteria; and
estimating an amount of symbol distortion caused by the nonlinearity based only on the symbols that meet the predetermined nonlinearity criteria.

16. The method of claim 15, wherein selecting the symbols that meet predetermined nonlinearity criteria includes:
dividing the multiple symbols mapped from the training sequence into high-level symbols and low-level symbols; and
selecting the high-level symbols.

17. The method of claim 16, wherein estimating the amount of symbol distortion includes:
receiving a returning symbol pattern that is generated at a receiver in response to the selected high-level symbols; and
generating look-up tables based only on the returning symbol pattern.

18. The method of claim 15, wherein selecting the symbols that meet predetermined nonlinearity criteria includes:
receiving a returning multiple symbol pattern that is generated at a receiver in response to the training sequence;
dividing multiple symbols of the returning multiple symbol pattern into high-level symbols and low-level symbols; and
selecting the high-level symbols.

19. The method of claim 18, wherein estimating the amount of symbol distortion includes generating look-up tables based only on the high-level symbols.

20. The method of claim 15, wherein estimating the amount of symbol distortion includes:
identifying an index to a look-up table;
determining an error value by subtracting the symbol pattern of a transmitted signal from the symbol pattern of a returning signal;
adding the error value to the look-up table with the index; and
averaging all the look-up table values.

* * * * *